US008140557B2

(12) United States Patent
Dettinger et al.

(10) Patent No.: US 8,140,557 B2
(45) Date of Patent: Mar. 20, 2012

(54) ONTOLOGICAL TRANSLATION OF ABSTRACT RULES

(75) Inventors: Richard D. Dettinger, Rochester, MN (US); Frederick A. Kulack, Rochester, MN (US); Xueyun S. Wang, San Jose, CA (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 11/748,705

(22) Filed: May 15, 2007

(65) Prior Publication Data

US 2008/0288235 A1    Nov. 20, 2008

(51) Int. Cl.
G06F 7/10    (2006.01)
G06F 17/30    (2006.01)

(52) U.S. Cl. ......... 707/760; 707/765; 707/794; 707/756

(58) Field of Classification Search .................. 707/100, 707/2, 4, 5, 104.1, 3, 999.002, 999.003, 999.004, 707/999.005, 999.1, 999.107, 756, 794, 760, 707/102, 999.102, 765, 694
See application file for complete search history.

(56) References Cited

U.S. PATENT DOCUMENTS

| 5,253,362 A | 10/1993 | Nolan et al. |
| 5,265,246 A | 11/1993 | Li et al. |
| 5,404,510 A | 4/1995 | Smith et al. |
| 5,418,950 A | 5/1995 | Li et al. |
| 5,446,885 A | 8/1995 | Moore et al. |
| 5,446,890 A | 8/1995 | Renslo et al. |
| 5,459,859 A | 10/1995 | Senda |
| 5,471,611 A | 11/1995 | McGregor |
| 5,499,368 A | 3/1996 | Tate et al. |
| 5,515,488 A | 5/1996 | Hoppe et al. |
| 5,721,903 A | 2/1998 | Anand et al. |
| 5,734,887 A | 3/1998 | Kingberg et al. |
| 5,806,066 A * | 9/1998 | Golshani et al. ............... 1/1 |
| 5,809,497 A | 9/1998 | Freund et al. |
| 5,870,559 A | 2/1999 | Leshem et al. |

(Continued)

FOREIGN PATENT DOCUMENTS

JP    2002149697 A    5/2002

OTHER PUBLICATIONS

"Ontology based Query Processing in Database Management Systems," Necib, Chori Ben; Freytag, Johann-Christoph; Dept of Computer Science, Humboldt-Universitat zu Berlin, Germany; Preceedings on 6th International Conference on Ontologies, Databases, and Applications of Semantics for Large Scale Information Systems (DBASE'2003), p. 37-99, 2003.*

(Continued)

Primary Examiner — James Trujillo
Assistant Examiner — Bruce Moser
(74) Attorney, Agent, or Firm — Patterson & Sheridan LLP (57) ABSTRACT

Embodiments of the invention provide techniques for selecting rule engines for processing abstract rules based on functionality and cost. In general, an abstract rule is analyzed to determine which functions are required to process the rule. The abstract rule is assigned to a rule engine by evaluating metadata describing the functions and costs of the rule engines. The abstract rule is then translated to the format required by the selected rule engine.

22 Claims, 5 Drawing Sheets

U.S. PATENT DOCUMENTS

| | | | |
|---|---|---|---|
| 5,918,232 A | 6/1999 | Pouschine et al. | |
| 5,958,008 A | 9/1999 | Pogrebisky et al. | |
| 5,999,933 A | 12/1999 | Mehta | |
| 6,003,034 A | 12/1999 | Tuli | |
| 6,014,656 A | 1/2000 | Hallmark et al. | |
| 6,026,363 A | 2/2000 | Shepard | |
| 6,061,506 A | 5/2000 | Wollaston et al. | |
| 6,076,066 A | 6/2000 | DiRienzo et al. | |
| 6,222,540 B1 | 4/2001 | Sacerdoti | |
| 6,272,488 B1 | 8/2001 | Chang et al. | |
| 6,289,334 B1 | 9/2001 | Reiner et al. | |
| 6,353,826 B1 | 3/2002 | Seputis | |
| 6,370,547 B1 | 4/2002 | Eftink | |
| 6,397,223 B1 | 5/2002 | Kori | |
| 6,442,543 B1 | 8/2002 | Snodgrass et al. | |
| 6,449,620 B1 | 9/2002 | Draper et al. | |
| 6,460,043 B1* | 10/2002 | Tabbara et al. | 707/100 |
| 6,484,162 B1 | 11/2002 | Edlund et al. | |
| 6,546,388 B1 | 4/2003 | Edlund et al. | |
| 6,553,368 B2 | 4/2003 | Martin et al. | |
| 6,578,027 B2 | 6/2003 | Cambot et al. | |
| 6,581,038 B1 | 6/2003 | Mahran | |
| 6,581,054 B1 | 6/2003 | Bogrett | |
| 6,581,055 B1 | 6/2003 | Ziauddin et al. | |
| 6,601,065 B1 | 7/2003 | Nelson et al. | |
| 6,609,123 B1 | 8/2003 | Cazemier et al. | |
| 6,618,727 B1 | 9/2003 | Wheeler et al. | |
| 6,633,817 B1 | 10/2003 | Walker et al. | |
| 6,643,633 B2 | 11/2003 | Chau et al. | |
| 6,647,382 B1 | 11/2003 | Saracco | |
| 6,651,055 B1 | 11/2003 | Kilmer et al. | |
| 6,725,225 B1 | 4/2004 | Kori | |
| 6,725,227 B1 | 4/2004 | Li | |
| 6,732,094 B1 | 5/2004 | Cousins et al. | |
| 6,745,178 B1 | 6/2004 | Emens et al. | |
| 6,772,150 B1 | 8/2004 | Whitman et al. | |
| 6,795,825 B2 | 9/2004 | Rishe | |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,954,748 B2 | 10/2005 | Dettinger et al. | |
| 6,978,324 B1 | 12/2005 | Black | |
| 6,985,912 B2 | 1/2006 | Mullins et al. | |
| 6,996,558 B2 | 2/2006 | Dettinger et al. | |
| 7,003,730 B2 | 2/2006 | Dettinger et al. | |
| 7,024,425 B2 | 4/2006 | Krishnaprasad et al. | |
| 7,054,877 B2 | 5/2006 | Dettinger et al. | |
| 7,096,217 B2 | 8/2006 | Dettinger et al. | |
| 7,096,229 B2 | 8/2006 | Dettinger et al. | |
| 7,139,774 B2 | 11/2006 | Dettinger et al. | |
| 7,146,376 B2 | 12/2006 | Dettinger et al. | |
| 7,213,017 B2 | 5/2007 | Rys et al. | |
| 7,249,118 B2 | 7/2007 | Sandler et al. | |
| 7,263,517 B2 | 8/2007 | Sheu et al. | |
| 7,310,639 B2 | 12/2007 | Dettinger et al. | |
| 7,321,895 B2 | 1/2008 | Dettinger et al. | |
| 7,333,981 B2 | 2/2008 | Dettinger et al. | |
| 7,340,475 B2 | 3/2008 | Chowdhary et al. | |
| 7,343,365 B2 | 3/2008 | Farnham et al. | |
| 7,363,287 B2 | 4/2008 | Kilmer et al. | |
| 7,383,255 B2 | 6/2008 | Desai et al. | |
| 7,440,945 B2 | 10/2008 | Dettinger et al. | |
| 7,444,332 B2 | 10/2008 | Dettinger et al. | |
| 7,461,052 B2 | 12/2008 | Dettinger et al. | |
| 7,480,648 B2 | 1/2009 | Adams et al. | |
| 7,519,577 B2 | 4/2009 | Brundage et al. | |
| 7,539,662 B2 | 5/2009 | Dettinger et al. | |
| 7,624,097 B2 | 11/2009 | Dettinger et al. | |
| 7,668,806 B2 | 2/2010 | Liu et al. | |
| 7,818,347 B2 | 10/2010 | Dettinger et al. | |
| 7,818,348 B2 | 10/2010 | Dettinger et al. | |
| 2001/0047270 A1 | 11/2001 | Gusick et al. | |
| 2002/0026630 A1 | 2/2002 | Schmidt et al. | |
| 2002/0046281 A1 | 4/2002 | Cope | |
| 2002/0078068 A1 | 6/2002 | Krishnaprasad et al. | |
| 2002/0091702 A1 | 7/2002 | Mullins | |
| 2002/0091990 A1 | 7/2002 | Little et al. | |
| 2002/0161602 A1 | 10/2002 | Dougherty et al. | |
| 2003/0014399 A1 | 1/2003 | Hansen et al. | |
| 2003/0046385 A1 | 3/2003 | Vincent | |
| 2003/0061215 A1 | 3/2003 | Messina | |
| 2003/0144994 A1 | 7/2003 | Wen et al. | |
| 2003/0163455 A1 | 8/2003 | Dettinger et al. | |
| 2003/0167274 A1* | 9/2003 | Dettinger et al. | 707/100 |
| 2003/0169284 A1 | 9/2003 | Dettinger et al. | |
| 2003/0172056 A1 | 9/2003 | Dettinger et al. | |
| 2003/0217033 A1 | 11/2003 | Sandler et al. | |
| 2003/0220893 A1 | 11/2003 | Dettinger et al. | |
| 2004/0030687 A1* | 2/2004 | Hidaka et al. | 707/3 |
| 2004/0039736 A1 | 2/2004 | Kilmer et al. | |
| 2004/0048233 A1 | 3/2004 | Matthews et al. | |
| 2004/0059746 A1 | 3/2004 | Error et al. | |
| 2004/0073539 A1 | 4/2004 | Dettinger et al. | |
| 2004/0148278 A1 | 7/2004 | Milo et al. | |
| 2004/0158567 A1 | 8/2004 | Dettinger et al. | |
| 2004/0243545 A1 | 12/2004 | Boone et al. | |
| 2004/0260685 A1 | 12/2004 | Pfleiger et al. | |
| 2004/0260691 A1 | 12/2004 | Desai et al. | |
| 2004/0267760 A1 | 12/2004 | Brundage et al. | |
| 2005/0068489 A1 | 3/2005 | Hall et al. | |
| 2005/0071222 A1 | 3/2005 | Bigus et al. | |
| 2005/0076015 A1 | 4/2005 | Dettinger et al. | |
| 2005/0144166 A1* | 6/2005 | Chapus et al. | 707/6 |
| 2005/0267760 A1 | 12/2005 | Meyer et al. | |
| 2006/0010127 A1 | 1/2006 | Dettinger et al. | |
| 2006/0047638 A1 | 3/2006 | Dettinger et al. | |
| 2006/0053142 A1 | 3/2006 | Sebbane | |
| 2006/0095457 A1 | 5/2006 | Glasspool et al. | |
| 2006/0122993 A1 | 6/2006 | Dettinger et al. | |
| 2006/0136382 A1 | 6/2006 | Dettinger et al. | |
| 2006/0136469 A1 | 6/2006 | Dettinger et al. | |
| 2006/0136470 A1 | 6/2006 | Dettinger et al. | |
| 2006/0155692 A1 | 7/2006 | Dettinger et al. | |
| 2006/0161521 A1 | 7/2006 | Dettinger et al. | |
| 2006/0212418 A1 | 9/2006 | Dettinger et al. | |
| 2006/0282469 A1 | 12/2006 | Pan | |
| 2007/0005566 A1 | 1/2007 | Bobick et al. | |
| 2007/0067371 A1 | 3/2007 | Allan et al. | |
| 2007/0112745 A1 | 5/2007 | Dettinger et al. | |
| 2007/0112827 A1 | 5/2007 | Dettinger et al. | |
| 2007/0112853 A1 | 5/2007 | Dettinger et al. | |
| 2007/0143285 A1* | 6/2007 | Drumm et al. | 707/5 |
| 2007/0162465 A1* | 7/2007 | Cope | 707/100 |
| 2008/0040308 A1* | 2/2008 | Ranganathan et al. | 707/1 |
| 2008/0077598 A1* | 3/2008 | Wilmering et al. | 707/100 |
| 2008/0091668 A1 | 4/2008 | Dettinger et al. | |
| 2008/0091690 A1* | 4/2008 | Ellersick et al. | 707/100 |
| 2008/0301108 A1 | 12/2008 | Dettinger et al. | |
| 2009/0055438 A1 | 2/2009 | Dettinger et al. | |
| 2009/0182708 A1 | 7/2009 | Dettinger et al. | |
| 2010/0076961 A1 | 3/2010 | Dettinger et al. | |

OTHER PUBLICATIONS

U.S. Appl. No. 11/272,583, entitled "Abstract Rule Sets," filed Nov. 10, 2005.

Office Action History for U.S. Appl. No. 11/272,587 from Oct. 31, 2007 to Jun. 17, 2008.

Office Action History for U.S. Appl. No. 11/272,588 from Nov. 5, 2007 to Jun. 13, 2008.

Raghavan et al., "On the Reuse of Past Optimal Queries," *Proceedings of the 18th Annual International ACM SIGIR Conference on Research and Development in Information Retrieval*, Association for Computing Machinery, Inc., 1995: pp. 344-350.

"Search Code: Search Your Database," <http://www.codewalkers.com/c/a/Search-Code/Search-Your-Database/>, retrieved Mar. 23, 2009, pp. 1-4.

Wen et al., "Clustering User Queries of a Search Engine," *Proceedings of the 10th International Conference on World Wide Web*, Association for Computing Machinery, Inc., 2001: pp. 162-168.

Wen et al., "Query Clustering in the Web Context," *Information Retrieval and Clustering*, Kluwer Academic Publishers, W. Wu and H. Xiong (Eds.) 2002: pp. 1-30.

Wen et al., "Query Clustering Using User Logs," *ACM Transactions on Information Systems*, Jan. 2002, vol. 20(1): pp. 59-81.

Office Action for U.S. Appl. No. 11/226,181 dated Feb. 11, 2011.
Batory et al., "Implementing a Domain Model for Data Structures[1,2]," *International Journal of Software Engineering and Knowledge Engineering*, Sep. 1992, vol. 2(3): pp. 375-402.
Braünmuller et al., "Multiple Similarity Queries: A Basic DBMS Operation for Mining in Metric Databases," *IEEE Transactions on Knowledge and Data Engineering*, Jan./Feb. 2001, vol. 13(1): pp. 79-95.
Franconi et al., "A Data Warehouse Conceptual Data Model for Multidimensional Aggregation," *Proceedings of the International Workshop on Design and Management of Data Warehouses (DMDW '99)*, 1999: pp. 13-1-13-10.
Meng et al., "A Theory of Translation From Relational Queries to Hierarchical Queries," *IEEE Transactions on Knowledge and Data Engineering*, Apr. 1995, vol. 7(2): pp. 228-245.
Office Action History for U.S. Appl. No. 10/083,075 from Nov. 26, 2004 to Sep. 1, 2005.
Office Action History for U.S. Appl. No. 11/226,181 from Mar. 25, 2009 to Aug. 10, 2010.
Office Action History for U.S. Appl. No. 10/403,356 from Sep. 20, 2005 to Jan. 12, 2006.
Office Action History for U.S. Appl. No. 11/360,353 from Feb. 21, 2008 to Jan. 21, 2009.
Office Action History for U.S. Appl. No. 11/005,435 from Feb. 23, 2007 to Aug. 8, 2008.
Office Action History for U.S. Appl. No. 11/005,418 from Mar. 12, 2007 to Aug. 4, 2008.
Office Action History for U.S. Appl. No. 11/953,935 from Jan. 5, 2010 to Sep. 29, 2010.
Office Action History for U.S. Appl. No. 11/035,710 from Apr. 19, 2007 to Nov. 6, 2007.
Office Action History for U.S. Appl. No. 11/951,675 from Jan. 25, 2010 to Jun. 11, 2010.
Office Action History for U.S. Appl. No. 12/018,132 from Mar. 2, 2010 to Jun. 10, 2010.
Office Action History for U.S. Appl. No. 11/035,563 from Apr. 1, 2009 to Jul. 9, 2009.
Office Action for U.S. Appl. No. 12/625,071 dated Oct. 27, 2010.
Office Action History for U.S. Appl. No. 11/272,583 from Nov. 1, 2007 to Oct. 6, 2010.

\* cited by examiner

ONTOLOGICAL TRANSLATION OF ABSTRACT RULES

CROSS-REFERENCE TO RELATED APPLICATIONS

This application is related to U.S. patent application Ser. No. 11/272,583, entitled "Abstract Rule Sets," filed Nov. 10, 2005. This related patent application is herein incorporated by reference in its entirety. Further, this application is related to commonly assigned U.S. Pat. No. 6,99A6,558, issued Feb. 7, 2006, entitled "Application Portability and Extensibility through Database Schema and Query Abstraction," which is incorporated by reference herein in its entirety. Furthermore, this application is related to commonly assigned, co-pending U.S. patent application Ser. No. 11/005,418, published as U.S. Publication No. 20060122993, entitled "Abstract Query Plan," filed Dec. 6, 2004.

BACKGROUND OF THE INVENTION

1. Field of the Invention

The invention generally relates to computer database systems. More particularly, the invention relates to techniques for ontological translation of abstract rules.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. A SQL query is composed from one or more clauses set off by a keyword. Well-known SQL keywords include the SELECT, WHERE, FROM, HAVING, ORDER BY, and GROUP BY keywords. Composing a proper SQL query requires that a user understand both the structure and content of the relational database as well as the complex syntax of the SQL query language (or other query language). The complexity of constructing an SQL statement, however, generally makes it difficult for average users to compose queries of a relational database.

Because of this complexity, users often turn to database query applications to assist them in composing queries of a database. One technique for managing the complexity of a relational database, and the SQL query language, is to use database abstraction techniques. Commonly assigned U.S. Pat. No. 6,996,558, entitled "Application Portability and Extensibility through Database Schema and Query Abstraction," discloses techniques for constructing a database abstraction model (DAM) over an underlying physical database.

U.S. Pat. No. 6,996,558 discloses embodiments of a DAM constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the DAM is tied to neither the syntax nor the semantics of the physical database, additional capabilities may be provided by the DAM without having to modify the underlying database. Thus, the DAM provides a platform for additional enhancements that allow users to compose meaningful queries easily, without having to disturb existing database installations.

Data that is collected and stored in a database can be used as input to analysis routines for various purposes, including know-how management, decision making and statistical analysis. For instance, in a broad variety of applications, analysis routines are executed on query results obtained by executing corresponding queries against an underlying database.

Analysis routines can be defined by rule sets including one or more rules, each having predicates and actions. Commonly, the rules will have the structure "IF [predicate] THEN [action]." A rule predicate is a conditional statement evaluated in a rule engine. If the predicate is satisfied (i.e., the condition is met), then the associated rule action is executed. In other words, a set of rules can be used to implement an analysis routine, and a rule engine can evaluate predicates and fire or execute actions defined in the rules. Where actions of rules are defined to provide recommendations for users, such as treatment recommendations for doctors in medical institutions, the rules can be defined such that corresponding predicates reflect expert-based knowledge of possible diagnoses and evaluations of patient conditions. In other words, rules can be implemented to assist doctors by making diagnosis recommendations, drug recommendations, providing reminders of required verifications and checks, etc.

However, the creation of rules is generally a complex and difficult process which requires detailed knowledge of a corresponding database(s). More specifically, for each predicate and each action of the given rule that the user wants to create, the user requires an understanding of the database schema in order to look up a corresponding column name in the underlying database table(s). One technique for managing the creation of rules is to use abstract rule sets. Commonly assigned U.S. application Ser. No. 11/272,583 (hereafter "the '583 application"), entitled "Abstract Rule Sets," discloses techniques for using abstract rule sets.

Typically, abstract rule sets are constructed to reflect the useful knowledge of experts in a given field. Thus, some abstract rule sets may be packaged for commercial sale to (or for sharing with) other entities lacking specific expertise. For example, a medical research institution may develop abstract rule sets for diagnosing diseases based on test results, and may then sell the abstract rule sets to hospitals and doctors.

However, in some cases, a purchased abstract rule may not be compatible with the DAM used by a purchaser. That is, the elements of the abstract rule (i.e., logical fields, values, etc.) may be not exist (or may have different meanings) in the purchaser's DAM. This incompatibility can arise because, by design, a DAM is intended to be customized to the ontologies (i.e., organizations of concepts and meanings) used by a given organization. For example, in an abstract rule created by a medical research institution, a logical field referencing a person may be named "Test Subject." However, in the DAM used by a hospital, the equivalent logical field may be named "Patient." Further, in the DAM used by a medical insurance company, the equivalent logical field may be named "Client." Thus, the exemplary abstract rule may not be usable by the hospital and by the medical insurance company. In general, if the DAM of the rule purchaser is structured around different ontologies than the DAM of the rule creator, an abstract rule will have to be translated to suit the DAM of the purchaser. Conventionally, this translation process must be performed manually, and is thus laborious and error-prone.

Therefore, there is a need for techniques for ontological translation of abstract rules.

SUMMARY OF THE INVENTION

The invention generally relates to computer database systems. More particularly, the invention relates to techniques for ontological translation of abstract rules.

One embodiment provides a computer-implemented method for ontological translation of abstract rules of a data abstraction model, comprising: receiving an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model; determining that the abstract rule is semantically incompatible with the data abstraction model; and translating semantic attributes of the abstract rule to make the abstract rule compatible with the data abstraction model, wherein the translating is done using a predefined ontology mapping.

Another embodiment provides a computer readable storage medium containing a program which, when executed, performs an operation, comprising: receiving an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model; determining that the abstract rule is semantically incompatible with the data abstraction model; and translating semantic attributes of the abstract rule to make the abstract rule compatible with the data abstraction model, wherein the translating is done using a predefined ontology mapping.

Yet another embodiment provides a system, comprising: an ontology mapping structure that relates equivalent meanings of a semantic concept defined from two or more data models; an abstract rule translator; and a processor configured to execute the abstract rule translator to: receive an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model; determine that the abstract rule is semantically incompatible with the data abstraction model; and translate semantic attributes of the abstract rule to make the abstract rule compatible with the data abstraction model, wherein the translating is done using the ontology mapping structure.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for ontological translation of abstract rules. In general, metadata describing an abstract rule is analyzed to determine if the semantic concepts of the elements of the abstract rule are included in the data abstraction model (DAM). If not, an ontology mapping is used to translate the elements of the abstract rule to semantic concepts which are included in the DAM.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
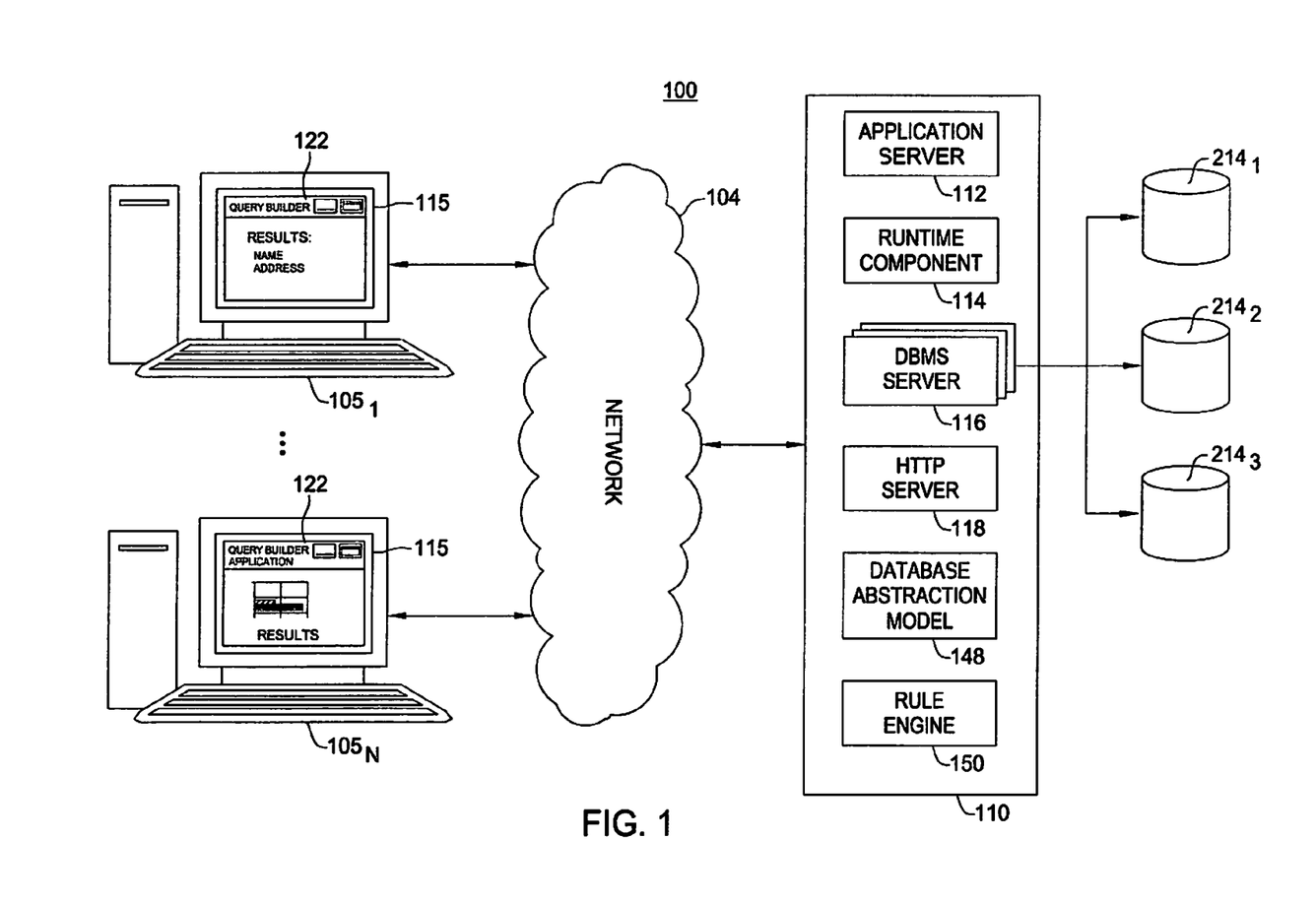
FIG. 1 is a block diagram illustrating a network environment, according to one embodiment of the invention.

FIG. 1 illustrates a network environment 100 using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's WebSphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query to the runtime component 114 for processing.

As illustrated in FIG. 1, server system 110 may further include a runtime component 114, a database management system (DBMS) 116, a database abstraction model 148, and a rule engine 150. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions, based on the focus of the abstract query.

In one embodiment, the rule engine 150 represents one or more rule engines (i.e., inference engines) configured to carry out analysis routines for various purposes, including know-how management, decision making and statistical analysis. More specifically, the rule engine 150 can carry out analysis routines by processing rule sets including one or more rules, with each rule having predicates and actions. The rule engine 150 may be a software application installed on server 110. Alternatively, the rule engine 150 may be provided as "software as a service" (SAAS), wherein functions on a remote hosted system are accessed over a network as required.

Figure 2:
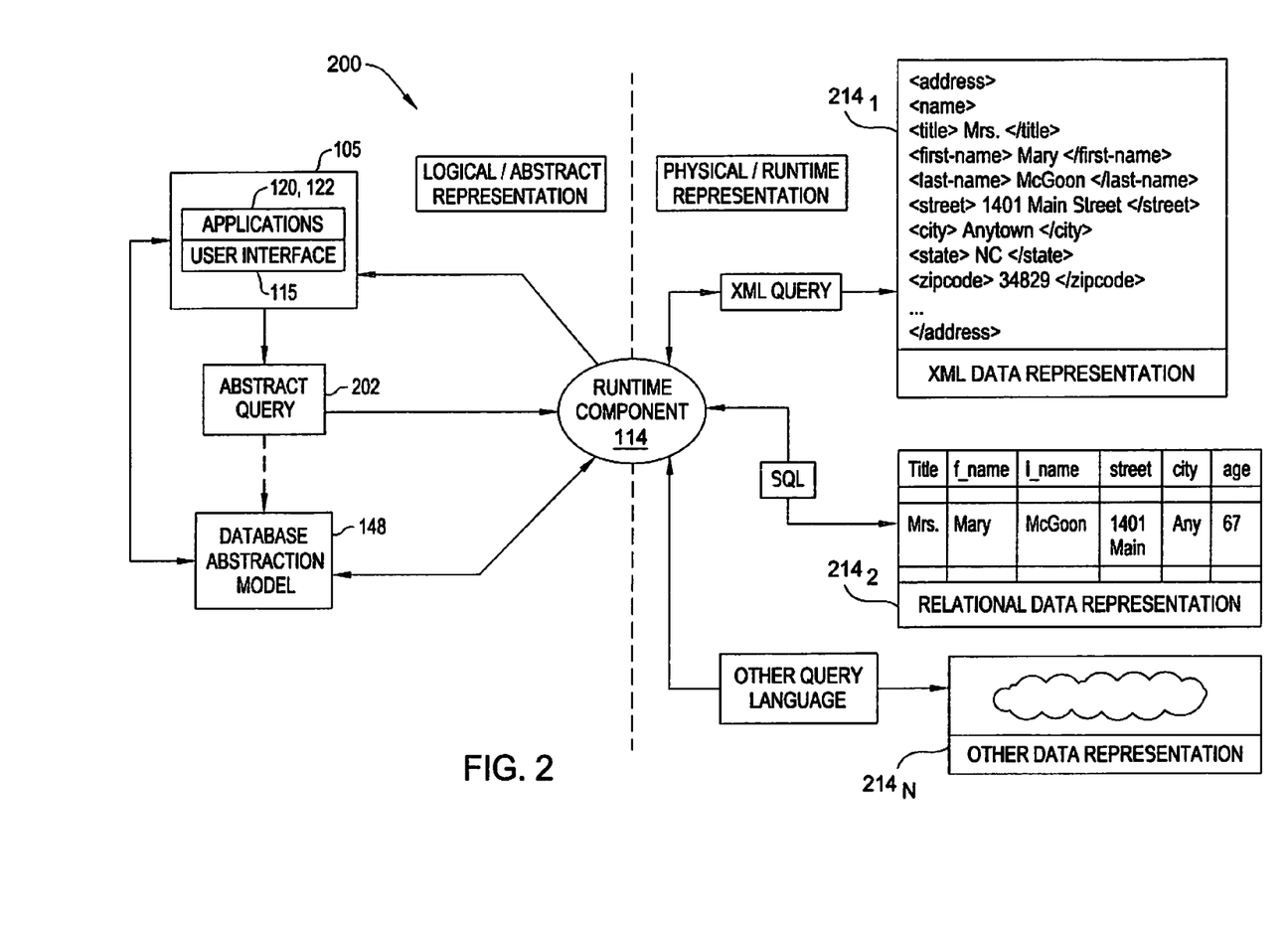
FIG. 2 is a logical view illustrating a database abstraction model constructed over an underlying physical database, according to one embodiment of the invention.

FIG. 2 illustrates a plurality of interrelated components of a database abstraction model, along with relationships between the logical view of data provided by the abstraction model environment (the left side of FIG. 2), and the underlying physical database mechanisms used to store the data (the right side of FIG. 2).

In one embodiment, users compose an abstract query 202 using the user interface 115. An abstract query 202 is generally referred to as "abstract" because it is composed using logical fields rather than direct references to data structures in the underlying physical databases 214. The logical fields include specifications of access methods for mapping to a physical view of the data, including various underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed). Particular types of access methods and embodiments for executing abstract queries are further described in commonly assigned U.S. Pat. No. 6,996,558, entitled "Application Portability and Extensibility through Database Schema and Query Abstraction," and commonly assigned, co-pending application titled "Abstract Query Plan," Ser. No. 11/005,418, filed Dec. 6, 2004, both of which are incorporated herein in their entirety.

Figure 3:
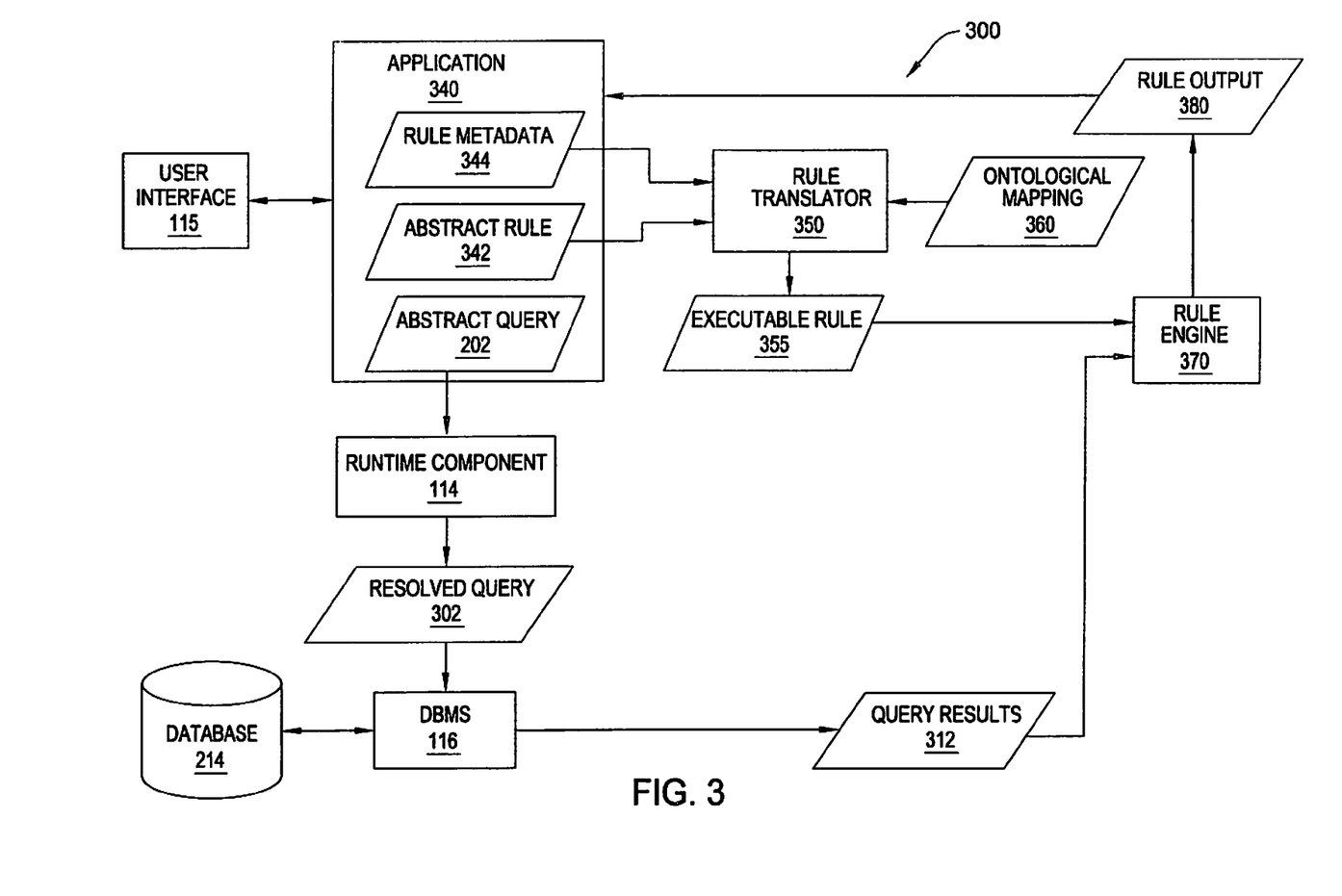
FIG. 3 illustrates a relational view of software components for performing the ontological translation of abstract rules, according to one embodiment of the invention.

FIG. 3 illustrates a relational view 300 of software components for performing the ontological translation of abstract rules, according to one embodiment of the invention. The software components of relational view 300 include a user interface 115, an application 340, a runtime component 114, a database management system (DBMS) 116, a database 214, a rule translator 350, and a rule engine 370.

As shown, the application 340 includes three data objects, an abstract rule 342, an abstract query 202, and rule metadata 344. Illustratively, the abstract rule 342, the abstract query 202, and rule metadata 344 are created in the user interface 115, which in this example is a graphical user interface. However, it should be noted that the user interface 115 is only shown by way of example; any suitable requesting entity may create abstract rule 342, abstract query 202, and rule metadata 344 (e.g., the application 340, an operating system, or an end user). Accordingly, all such implementations are broadly contemplated.

In one embodiment, the abstract query 202 is translated by the runtime component 114 into a resolved query 302. The resolved query 302 is submitted to the DBMS 116 for execution against the database 214, thus producing a set of query results 312. The query results 312 include field values which can be used as inputs to an abstract rule 342. However, it should be noted that the present invention is not limited to the use of field values obtained from query results as inputs to the abstract rule 342. Instead, any suitable inputs to the abstract rule 342 are broadly contemplated including, for instance, a user inputting data via the user interface 115.

As described above, the abstract query 202 is composed by using logical fields to specify query conditions and results fields. Similarly, the abstract rule 342 is composed by using logical fields to specify a rule predicate and a rule action. In one embodiment, the elements (i.e., logical fields, values, etc.) that make up the abstract rule 342 are words that represent semantic concepts. This aspect can be illustrated with the following abstract rule:

IF (gender=male) AND (blood sugar>36)
THEN diagnosis=diabetes
ELSE diagnosis=unspecified In this example, the elements of the abstract rule are the words "gender," "male," "blood sugar," "diagnosis," "diabetes," and "unspecified." Each element represents a semantic concept. For instance, the word "gender" refers to the concept of biological sex of a person (i.e., either man or woman). The particular words used to represent semantic concepts can be structured into ontologies (i.e., organizations of concepts and meanings). Typically, ontologies are created to organize meanings within a domain (i.e., field of knowledge). For example, the Unified Medical Language System (UMLS) ontology is well-known in the domain of biomedical science.

In one embodiment, the rule metadata 344 is a data structure which specifies a semantic concept identifier and ontology for each element of the abstract rule 342. The combination of semantic concept identifier and ontology serves to identify the semantic meaning of a rule element. The rule metadata 344 may be a single data structure that describes the elements of all abstract rules 342 available in the application 340. Alternatively, the application 340 may include several rule metadata 344, with each rule metadata 344 describing the elements of a single abstract rule 342. The rule metadata 344 may be packaged in a stand-alone data file, may be incorporated into the DAM, or may be embedded (e.g., by XML tags) into the abstract rules 342. The rule metadata 344 may be generated at the same time the corresponding abstract rules 342 are created, or may be generated at a later time.

Examples of rule metadata 344 are shown in Table I and Table II below. For illustrative purposes, these examples are defined using the XML language. However, it is contemplated that other languages may be used instead.

TABLE I

RULE METADATA EXAMPLE

| | |
|---|---|
| 001 | <RuleMetadata> |
| 002 |   <Element name= "Test Subject"> |
| 003 |     <ontology name= "Medical Research"> |
| 004 |     <concept value= "0102"> |
| 005 |   </Element> |
| 006 |   <Element name= "Gender"> |
| 007 |     <ontology name= "Medical Research"> |
| 008 |     <concept value= "0103"> |
| 009 |   </Element> |
| 010 |   <Element name= "male"> |
| 011 |     <ontology name= "People"> |
| 012 |     <concept value= "0011"> |
| 013 |   </Element> |
| 014 |   <Element name= "female"> |
| 015 |     <ontology name= "People"> |
| 016 |     <concept value= "0012"> |
| 017 |   </Element> |
| 018 | </RuleMetadata> |

As shown in Table I, the rule metadata example is bracketed by an opening tag on line 1, and a closing tag on line 18. Lines 2-5 specify the element "Test Subject" of an abstract rule 342 described by the rule metadata. Lines 3-4 specify that the element "Test Subject" corresponds to the semantic concept identifier "0102" of the ontology "Medical Research." Lines 6-9 specify that the element "Gender" corresponds to the semantic concept identifier "0103" of the ontology "Medical Research." Lines 10-13 specify that the element "male" corresponds to the semantic concept identifier "0011" of the ontology "People." Lines 14-17 specify that the element "female" corresponds to the semantic concept identifier "0012" of the ontology "People."

In the example shown in Table I, the rule metadata describes the elements of an exemplary abstract rule. The elements are described with the name of an ontology (e.g., "Medical Research"), and an identifier (e.g., "0102"), which specifies a specific semantic concept (e.g., "Test Subject") that is part of the ontology. Of course, Table I is provided as an illustrative example. It is contemplated that the rule metadata could include any elements, concepts, ontologies, or other information that describes the abstract rules.

TABLE II

RULE METADATA EXAMPLE

| 001 | <RuleMetadata> |
| --- | --- |
| 002 | <Element name= "Patient"> |
| 003 | <ontology name= "Hospital"> |
| 004 | <concept value= "005"> |
| 005 | </Element> |
| 006 | <Element name= "Sex"> |
| 007 | <ontology name= "Hospital"> |
| 008 | <concept value= "009"> |
| 009 | </Element> |
| 010 | <Element name= "Man"> |
| 011 | <ontology name= "Demographic"> |
| 012 | <concept value= "01"> |
| 013 | </Element> |
| 014 | <Element name= "Woman"> |
| 015 | <ontology name= "Demographic"> |
| 016 | <concept value= "02"> |
| 017 | </Element> |
| 018 | </RuleMetadata> |

Table II shows an example of a rule metadata with elements that have the same meaning as the elements shown in Table I. However, in Table II, the elements correspond to alternate ontologies. For example, lines 2-5 of Table II specify the element "Patient," which corresponds to the semantic concept identifier "005" of the ontology "Hospital." This element has the same meaning as the element "Test Subject" of Table I. That is, "Test Subject" and "Patient" are semantic equivalents for different ontologies. Similarly, the element "Sex" corresponds to semantic concept identifier "009" of the ontology "Hospital," and has the same meaning as the element "Gender" shown in Table I.

The semantic concept identifier and ontology specified in the metadata enable the meaning of the described element to be determined programmatically (i.e., without requiring human intervention). As a result, the elements of a given abstract rule (e.g., the abstract rule 342 of FIG. 3) can be translated programmatically to alternative ontologies. This ontological translation may be performed, for example, by rule translator 350 using an ontological mapping 360. In one embodiment, the ontological mapping 360 specifies words or concepts of different ontologies that have an equivalent meaning. More specifically, the ontological mapping 360 specifies data pairs which have equivalent meanings, with each data pair consisting of an ontology name and a semantic concept identifier (e.g., "Medical Research" and "0102").

An example of the ontological mapping 360 is shown in Table III below. For illustrative purposes, this example is defined using the XML language. However, it is contemplated that other languages may be used instead.

TABLE III

ONTOLOGICAL MAPPING EXAMPLE

| 001 | <ONTOLOGICAL MAPPING> |
| --- | --- |
| 002 | <Group name= "01"> |
| 003 | <ontology name= "Medical Research" concept value= "0102"> |
| 004 | <ontology name= "Hospital" concept value= "005"> |
| 005 | <ontology name= "Doctor" concept value= "12"> |
| 006 | </Group> |
| 007 | <Group name= "02"> |
| 008 | <ontology name= "Medical Research" concept value= "0103"> |
| 009 | <ontology name= "Hospital" concept value= "009"> |
| 010 | <ontology name= "Doctor" concept value= "23"> |
| 011 | </Group> |
| 012 | <Group name= "03"> |
| 013 | <ontology name= "Medical Research" concept value= "0104"> |
| 014 | <ontology name= "Hospital" concept value= "003"> |
| 015 | <ontology name= "Doctor" concept value= "86"> |
| 016 | </Group> |
| 017 | </ONTOLOGICAL MAPPING> |

As shown in Table III, the exemplary ontological mapping 360 is bracketed by an opening tag on line 1, and a closing tag on line 17. Lines 2-6 specify a group of data pairs that have the same meaning. That is, line 3 specifies the data pair of the ontology "Medical Research" and the concept identifier "0102" which has the same meaning as the data pair on line 4 (i.e., ontology "Hospital" and concept "005") and the data pair on line 5 (i.e., ontology "Doctor" and concept "12"). Similarly, lines 7-11 specify another group of data pairs that have an equivalent meaning. Lines 12-16 specify yet another group of data pairs that have an equivalent meaning. Accordingly, "Test Subject" (Table I) is defined to have the same meaning as "Patient" (Table II), since the two semantic concepts are mapped to each other by the ontological mapping 360. Thus, translating an element of an abstract rule can be performed by locating the corresponding data pair in the ontological mapping 360, and identifying other data pairs in the same group. Of the data pairs in the same group, one data pair can be selected which is compatible with the DAM being used. For example, for a DAM having a "Patient" logical field, an abstract rule defining metadata for the semantic concept "Test Subject" would be incompatible in the absence of the ontological mapping 360. With the ontological mapping 360, however, the given abstract rule can be translated to be compatible by indexing into the ontological mapping 360 with the data pair for "Test Subject" (i.e., ontology="Medical Research", concept="0102") and identifying the corresponding data pairs: <ontology name="Hospital" concept value="005"> and <ontology name="Doctor" concept value="12">. A data pair may then be selected by determining if it is compatible with the DAM being used. Of course, Table III is provided as an illustrative example. It is contemplated that the ontological mapping 360 could be structured according to any suitable approach.

Referring again to FIG. 3, the abstract rule 342 is translated into the executable rule 355 by the rule translator 350, according to one embodiment. As a result of the translation, the executable rule 355 is formatted in the data format required by the rule engine. One example of such a data format is the Arden syntax, which is used in rule engines for medical knowledge. Further, the executable rule 355 is resolved to the database 214. That is, instead of the logical fields referenced by the abstract rule 342, the executable rule 355 references data structures in the underlying physical database 214. In one embodiment, the executable rule 355 is also ontologically translated by the rule translator 350. That is, the executable rule 355 is resolved to the database, is formatted for the rule engine, and also includes the translated semantic concepts provided by the ontological mapping 360. Alternatively, the executable rule 355 may be ontologically translated at runtime. That is, the ontological translation of the executable rule 355 may be performed by the rule engine 370 using the ontological mapping 360. All of these embodiments are contemplated.

In one embodiment, the executable rule 355 is processed by the rule engine 370, using the query results 312 as an input. This processing results in a rule output 380, which is returned to the application 340 for completing analysis routines, such as diagnosis recommendations, drug recommendations, and the like.

It should be noted that the components of the relational view 300 are illustratively shown as separate software components. However, embodiments are contemplated in which functionality of any component may be incorporated in another component.

Figure 4:
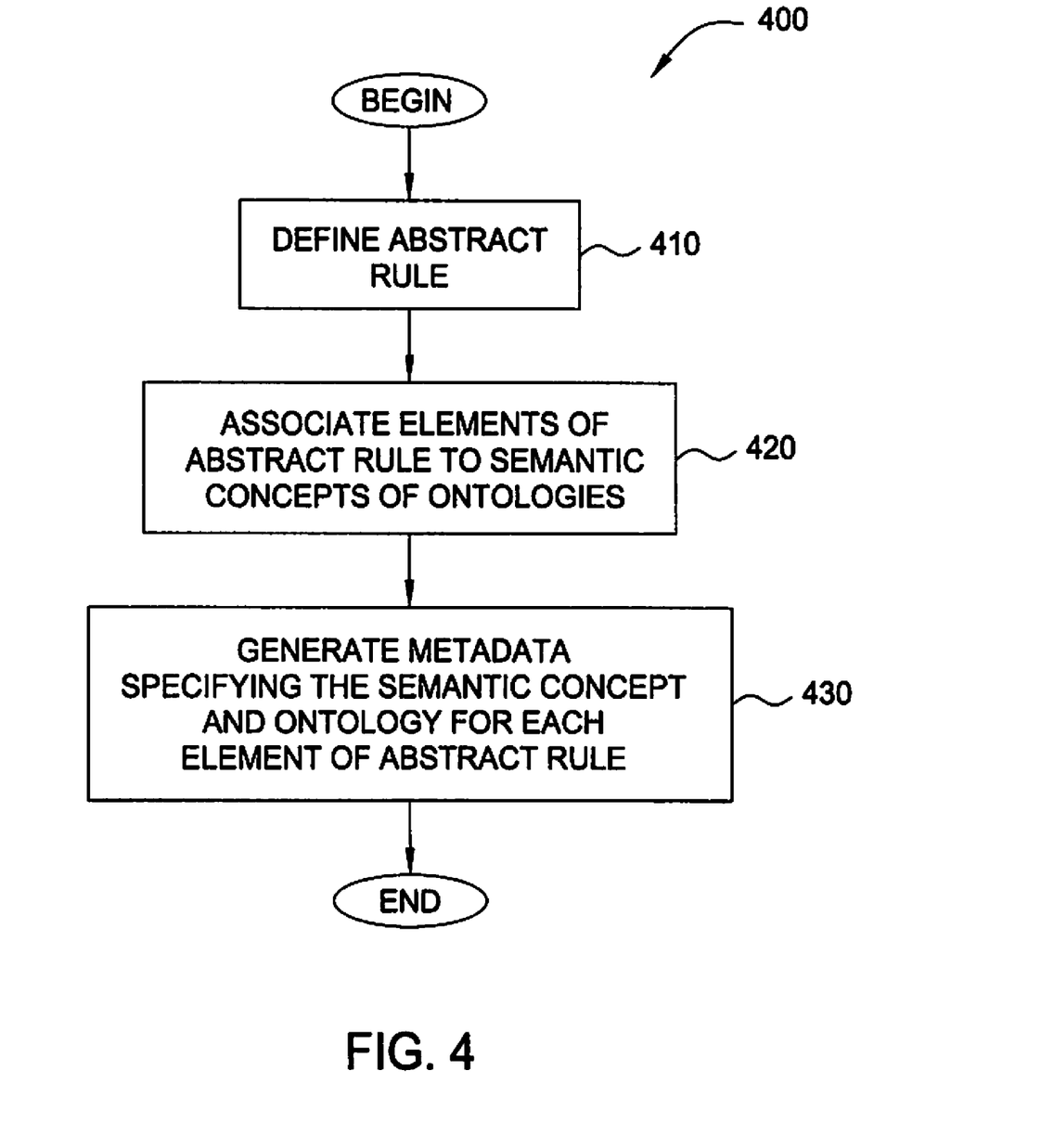
FIG. 4 is a flow diagram illustrating a method for generating metadata specifying the semantic concept and ontology for each element of an abstract rule, according to one embodiment of the invention.

FIG. 4 is a flow diagram illustrating a method 400 for generating metadata specifying the semantic concept and ontology for each element of an abstract rule, according to one embodiment of the invention. The method 400 may be performed by the creator of an abstract rule. The method 400 begins at step 410, by defining an abstract rule. For example, abstract rule 342, which may be generated by a user interacting with user interface 115, or by some other entity. At step 420, the elements of the abstract rule are associated to semantic concepts (i.e., meanings) of specific ontologies. This association may be performed, for example, by a user interacting with user interface 115. The method 400 ends at step 430, by generating rule metadata which specifies the semantic concept and ontology that is associated to each element of the abstract rule. For example, rule metadata 344. The rule metadata may be stored in a stand-alone data file, may be embedded in the abstract rule (e.g., in XML tags), may be included in the DAM, or may be stored by some other method. Once the metadata is generated, it may be used to translate the abstract rule for use with a different DAM than the one used to generate the abstract rule.

Figure 5:
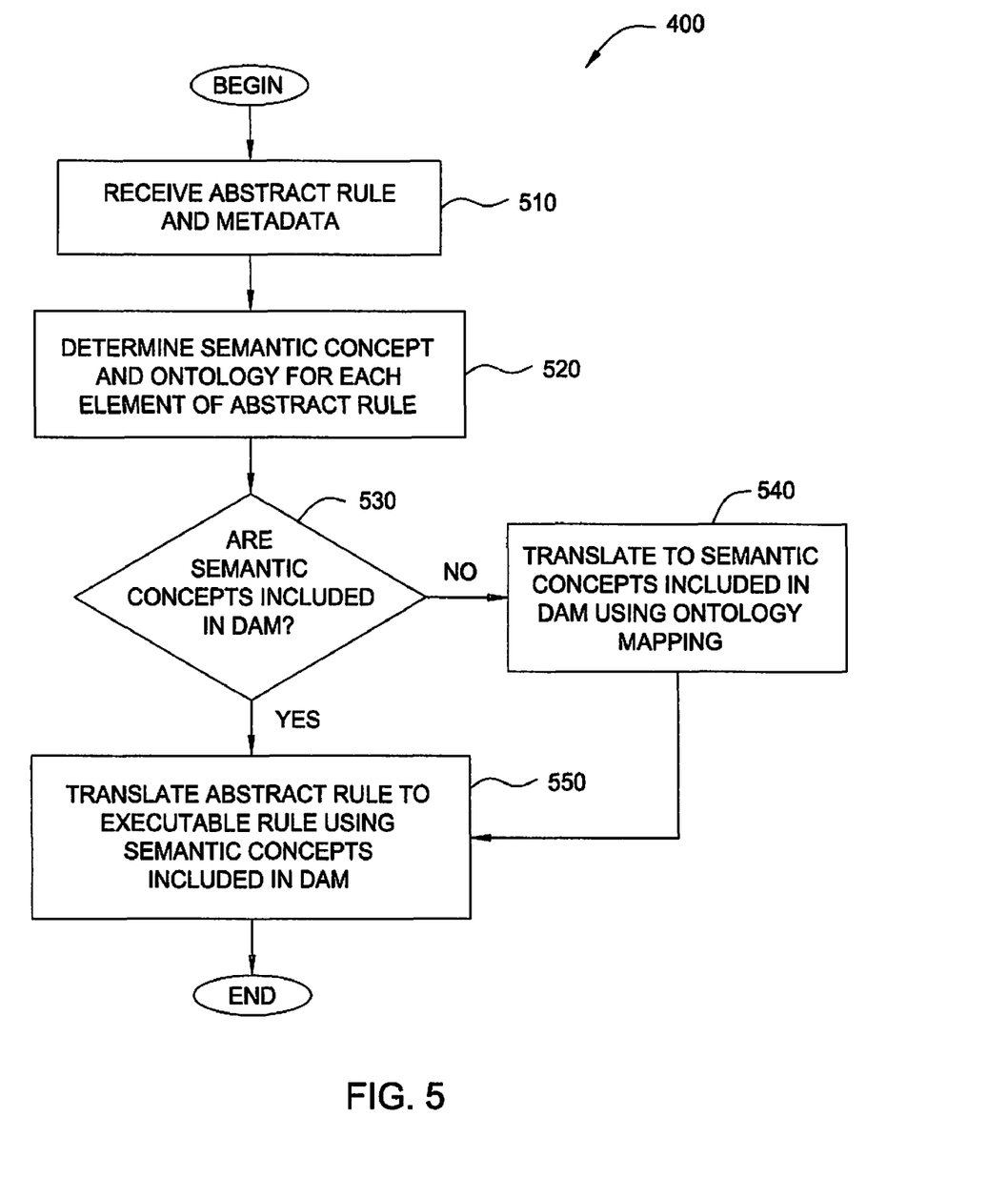
FIG. 5 is a flow diagram illustrating a method for translating an abstract rule using metadata specifying the semantic concept and ontology of each element of the abstract rule, according to one embodiment of the invention.

FIG. 5 is a flow diagram illustrating a method 500 for translating an abstract rule using metadata specifying the semantic concept and ontology of each element of the abstract rule, according to one embodiment of the invention. The method 500 is performed by the user of an abstract rule. The method 500 begins at step 510, by receiving an abstract rule and the corresponding rule metadata. The rule metadata may generated by the method 400 described above, or by any other similar method. At step 520, the semantic concepts and ontologies of each element of the abstract rule are determined from the rule metadata (e.g., rule metadata 344). The semantic concepts and ontologies enable each element to be translated to a semantic concept included in a different ontology. This step may be performed, for example, by a rule translator 350.

At step 530, it is determined whether the semantic concepts and ontologies of the elements of the abstract rule are included in the DAM. One embodiment for performing this step is to compare the ontologies contained in the rule metadata 344 to a list of ontologies included in the DAM. In another embodiment, the rule metadata 344 may be compared to metadata included in the DAM which describes the semantic concepts and ontologies of the logical fields of the DAM. In yet another embodiment, the rule metadata 344 may be compared to semantic concept and ontology attributes included in the logical field definitions. Of course, it is contemplated that this step may be performed by any other suitable method.

If the semantic concepts and ontologies of the elements of the abstract rule are not included in the DAM, the method 500 continues at step 540, where the elements are translated to semantic concepts which are included in the DAM. In one embodiment, this step is performed by the rule translator 350 using the ontological mapping 360. The ontological mapping 360 specifies data pairs which have equivalent meanings. Each data pair consists of an ontology name and a semantic concept identifier (e.g., line 3 of Table III). The ontological mapping 360 may be a stand-alone data file, or may be part of the DAM. The method 500 ends at step 550, where the abstract rule is translated to an executable rule (e.g., executable rule 355) using the semantic concepts that are available in the DAM. It should be noted that the executable rule may include elements that are already included in the DAM, and thus do not require ontological translation. That is, the executable rule may reflect a combination of original and translated semantic concepts. This step may be performed using, for example, the rule translator 350. Alternatively, the ontological translation may be performed after the executable rule has been created. That is, the ontological translation may occur at the time of running the executable rule, and may be performed, for example, by the rule engine 370. All of the above embodiments are contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
receiving an abstract rule having a conditional statement and a consequential statement, wherein the consequential statement defines a particular recommendation that is returned when the conditional statement is satisfied, wherein the conditional statement and the consequential statement are defined using logical field definitions defined in a first data abstraction model, and wherein one or more field values from a query result set are used as one or more inputs to the abstract rule;
determining that the abstract rule is semantically incompatible with a second data abstraction model; and
translating semantic attributes of the abstract rule to make the abstract rule compatible with the second data abstraction model, wherein the translating is done using a predefined ontology mapping that maps equivalent semantic concepts from a first ontology to a second ontology, where each equivalent semantic concept is represented using different terms in each of the respective ontologies.

2. The computer-implemented method of claim 1, wherein determining that the abstract rule is semantically incompatible with the second data abstraction model comprises analyzing metadata describing the abstract rule to identify one or more values corresponding to a semantic concept of the abstract rule, and wherein translating the semantic attributes of the abstract rule comprises accessing the predefined ontology mapping, using the one or more identified values, to identify a semantic equivalent to the semantic concept of the abstract rule.

3. The computer-implemented method of claim 2, wherein determining that the abstract rule is semantically incompatible with the second data abstraction model further comprises comparing the one or more identified values to metadata describing the semantic concept of the second data abstraction model.

4. The computer-implemented method of claim 1, wherein the logical field definitions defined in each data abstraction model include a reference to an access method selected from at least two different types of access methods, each type of access method configured to expose a portion of underlying physical data in a different manner.

5. The computer-implemented method of claim 1, further comprising:
   transforming the abstract rule into an executable rule;
   processing the executable rule using a rule engine; and
   upon determining that the conditional statement is resolved to true for the processed executable rule, returning the particular recommendation.

6. The computer-implemented method of claim 5, wherein processing the executable rule comprises:
   receiving the query result set; and
   determining, from the query result set, one or more inputs against which the conditional statement is resolved, wherein the executable rule includes the one or more inputs.

7. The computer-implemented method of claim 5, wherein transforming the abstract rule into the executable rule comprises:
   retrieving a specification of the abstract rule in a first computer-readable language; and
   transforming the specification into a language which is accepted by the rule engine.

8. The computer-implemented method of claim 1, wherein the predefined ontology mapping comprises groupings of data pairs, wherein each data pair within a grouping shares a common meaning, wherein each data pair comprises a semantic concept identifier and a name of an ontology, and wherein the semantic concept identifier identifies a semantic concept that is part of the named ontology.

9. A computer-readable storage medium containing a program which, when executed, performs an operation comprising:
   receiving an abstract rule having a conditional statement and a consequential statement, wherein the consequential statement defines a particular recommendation that is returned when the conditional statement is satisfied, wherein the conditional statement and the consequential statement are defined using logical field definitions defined in a first data abstraction model, and wherein one or more field values from a query result set are used as one or more inputs to the abstract rule;
   determining that the abstract rule is semantically incompatible with a second data abstraction model; and
   translating semantic attributes of the abstract rule to make the abstract rule compatible with the second data abstraction model, wherein the translating is done using a predefined ontology mapping that maps equivalent semantic concepts from a first ontology to a second ontology, where each equivalent semantic concept is represented using different terms in each of the respective ontologies.

10. The computer-readable storage medium of claim 9, wherein determining that the abstract rule is semantically incompatible with the second data abstraction model comprises analyzing metadata describing the abstract rule to identify one or more values corresponding to a semantic concept of the abstract rule, and wherein translating the semantic attributes of the abstract rule comprises accessing the predefined ontology mapping, using the one or more identified values, to identify a semantic equivalent to the semantic concept of the abstract rule.

11. The computer-readable storage medium of claim 10, wherein determining that the abstract rule is semantically incompatible with the second data abstraction model further comprises comparing the one or more identified values to metadata describing the semantic concept of the second data abstraction model.

12. The computer-readable storage medium of claim 9, wherein the logical field definitions defined in each data abstraction model include a reference to an access method selected from at least two different types of access methods, each type of access method configured to expose a portion of underlying physical data in a different manner.

13. The computer-readable storage medium of claim 9, further comprising:
   transforming the abstract rule into an executable rule;
   processing the executable rule using a rule engine; and
   upon determining that the conditional statement is resolved to true for the processed executable rule, returning the particular recommendation.

14. The computer-readable storage medium of claim 13, wherein processing the executable rule comprises:
   receiving the query result set; and
   determining, from the query result set, one or more inputs against which the conditional statement is resolved, wherein the executable rule includes the one or more inputs.

15. The computer-readable storage medium of claim 13, wherein transforming the abstract rule into the executable rule comprises:
   retrieving a specification of the abstract rule in a first computer-readable language; and
   transforming the specification into a language which is accepted by the rule engine.

16. The computer-readable storage medium of claim 9, wherein the predefined ontology mapping comprises groupings of data pairs, wherein each data pair within a grouping shares a common meaning, wherein each data pair comprises a semantic concept identifier and a name of an ontology, and wherein the semantic concept identifier identifies a semantic concept that is part of the named ontology.

17. A system comprising:
   an ontology mapping structure that relates equivalent meanings of a semantic concept defined from at least a first data abstraction model and a second data abstraction model;
   an abstract rule translator; and
   a processor configured to execute the abstract rule translator to:
      receive an abstract rule having a conditional statement and a consequential statement, wherein the consequential statement defines a particular recommendation that is returned when the conditional statement is satisfied, wherein the conditional statement and the consequential statement are defined using logical field definitions defined in the first data abstraction model, and wherein one or more field values from a query result set are used as one or more inputs to the abstract rule;
      determine that the abstract rule is semantically incompatible with the second data abstraction model; and
      translate semantic attributes of the abstract rule to make the abstract rule compatible with the second data abstraction model, wherein the translating is done using the ontology mapping structure that maps equivalent semantic concepts from a first ontology to a second ontology, where each equivalent semantic concept is represented using different terms in each of the respective ontologies.

18. The system of claim 17, wherein determining that the abstract rule is semantically incompatible with the second data abstraction model comprises analyzing metadata describing the abstract rule to identify one or more values corresponding to a semantic concept of the abstract rule, and wherein translating the semantic attributes of the abstract rule comprises accessing the predefined ontology mapping, using the one or more identified values, to identify a semantic equivalent to the semantic concept of the abstract rule.

19. The system of claim 18, wherein determining that the abstract rule is semantically incompatible with the second data abstraction model further comprises comparing the one or more identified values to metadata describing the semantic concept of the second data abstraction model.

20. The system of claim 17, wherein the logical field definitions defined in each data abstraction model include a reference to an access method selected from at least two different types of access methods, each type of access method configured to expose a portion of underlying physical data in a different manner.

21. The system of claim 17, wherein the ontology mapping structure comprises groupings of data pairs, wherein each data pair within a grouping shares a common meaning, wherein each data pair comprises a semantic concept identifier and a name of an ontology, and wherein the semantic concept identifier identifies a semantic concept that is part of the named ontology.

22. The system of claim 17, wherein the processor is further configured to:
   transform the abstract rule into an executable rule;
   process the executable rule; and
   upon determining that the conditional statement is resolved to true for the processed executable rule, return the particular recommendation.

* * * * *